United States Patent
Konishi et al.

(10) Patent No.: US 7,411,624 B2
(45) Date of Patent: Aug. 12, 2008

(54) IMAGE SENSING APPARATUS, CONTROL METHOD THEREFOR, PROGRAM, AND STORAGE MEDIUM

(75) Inventors: Kazuki Konishi, Tokyo (JP); Kota Terayama, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 759 days.

(21) Appl. No.: 10/971,093

(22) Filed: Oct. 25, 2004

(65) Prior Publication Data

US 2005/0099523 A1 May 12, 2005

(30) Foreign Application Priority Data

Nov. 6, 2003 (JP) ............................. 2003-377264
Jun. 1, 2004 (JP) ............................. 2004-163743

(51) Int. Cl.
*G03B 13/00* (2006.01)
*H04N 5/232* (2006.01)

(52) U.S. Cl. .................... 348/345; 348/348; 348/297; 348/347

(58) Field of Classification Search ............... 348/345, 348/347, 349, 350
See application file for complete search history.

(56) References Cited

U.S. PATENT DOCUMENTS

| | | | |
|---|---|---|---|
| 4,907,024 A * | 3/1990 | Takahashi | 396/104 |
| 5,138,359 A | 8/1992 | Nagano et al. | 354/406 |
| 5,412,448 A * | 5/1995 | Kunishige | 396/97 |
| 5,790,192 A | 8/1998 | Konishi et al. | 348/334 |
| 6,229,959 B1 | 5/2001 | Suda et al. | 396/50 |
| 7,280,147 B2 * | 10/2007 | Kitajima et al. | 348/345 |
| 2004/0240871 A1 * | 12/2004 | Shinohara | 396/104 |
| 2005/0128341 A1 * | 6/2005 | Murakami | 348/345 |

FOREIGN PATENT DOCUMENTS

| | | |
|---|---|---|
| JP | 5-119250 | 5/1993 |
| JP | 2000-111792 | 4/2000 |
| JP | 2003-107333 | 4/2003 |

* cited by examiner

*Primary Examiner*—Lin Ye
*Assistant Examiner*—Euel K Cowan
(74) *Attorney, Agent, or Firm*—Fitzpatrick, Cella, Harper & Scinto

(57) ABSTRACT

An object of this invention is to increase the precision and speed of autofocusing operation. To achieve this object, an image sensing apparatus includes a photographing optical system which forms an object image, the photographing optical system having a focusing optical system which adjusts the imaging position of the object image, an image sensing element which photoelectrically converts the object image formed by the photographing optical system to generate an electrical image signal, an in-focus position detection device which detects the in-focus position of the focusing optical system for forming the object image on the image sensing element, on the basis of the image signal generated by the image sensing element while the focusing optical system adjusts the imaging position of the object image, and a distance measurement device which has a plurality of light-receiving portions for receiving a beam from an object, and measures a distance to the object on the basis of output signals from the light-receiving portions.

8 Claims, 8 Drawing Sheets

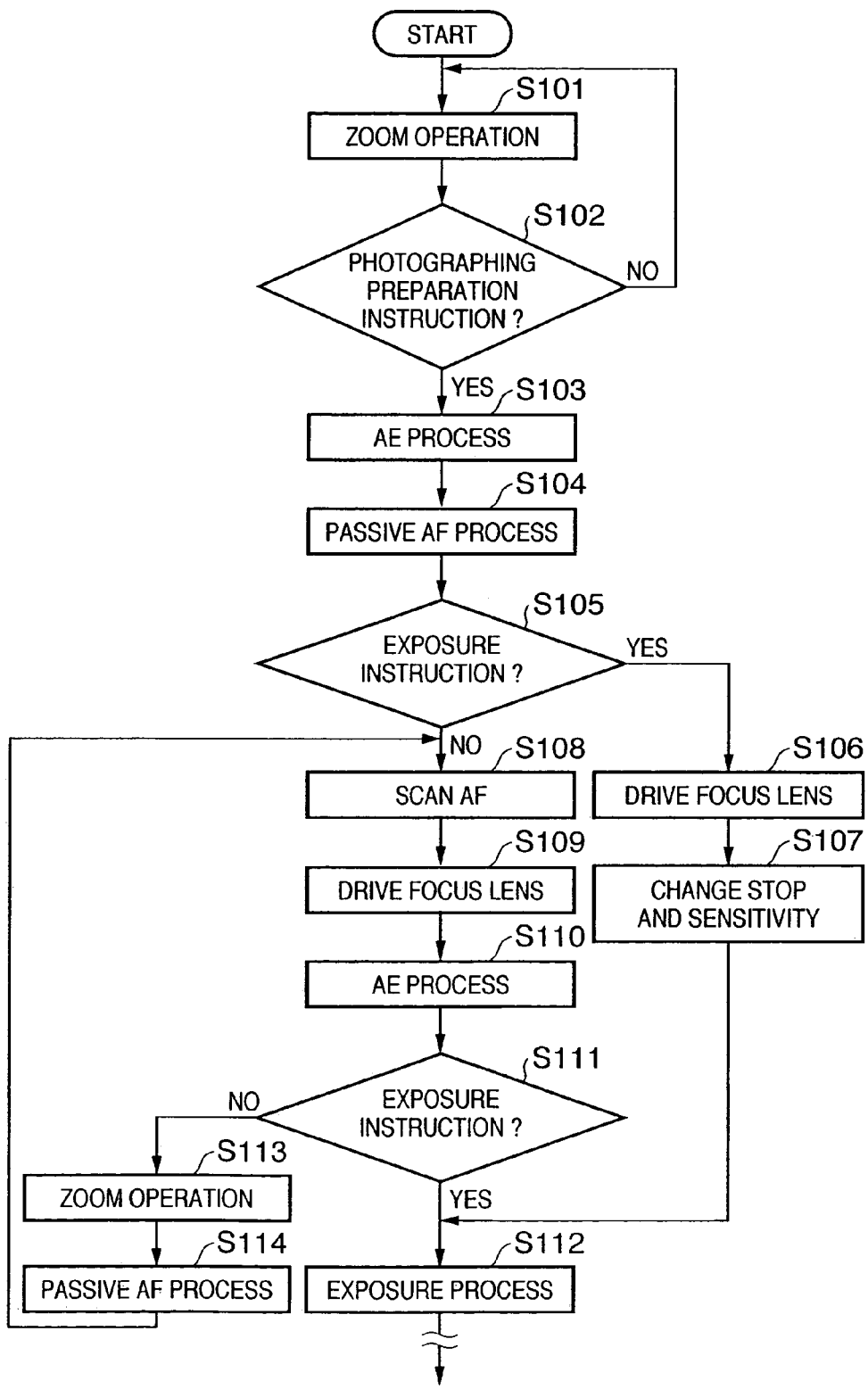

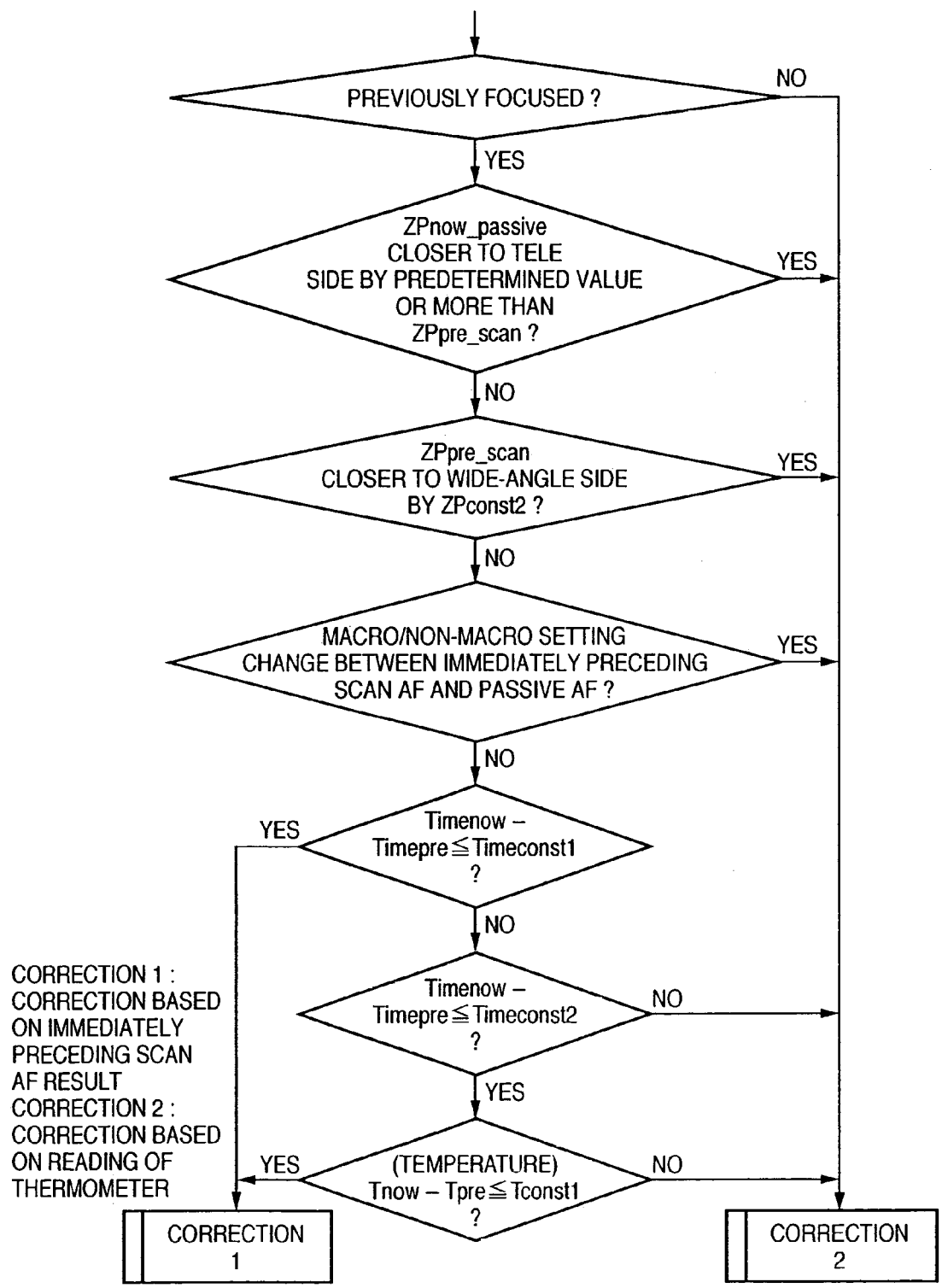

IMAGE SENSING APPARATUS, CONTROL METHOD THEREFOR, PROGRAM, AND STORAGE MEDIUM

FIELD OF THE INVENTION

The present invention relates to an autofocusing technique and, more particularly, to an autofocusing technique of adjusting the focus by using an image signal acquired by an image sensing element which photoelectrically converts an object image formed by an image sensing optical system.

BACKGROUND OF THE INVENTION

An electronic camera often adopts a low-cost, high-precision contrast detection (scan AF) autofocusing apparatus which adjusts the focus in accordance with the high-frequency component of the image signal of an object image formed on an image sensing element while driving a focus lens. However, it becomes difficult for such an electronic camera to realize both a high AF precision and high speed along with increases in magnification and the number of pixels. To meet this demand, there has been proposed a system which comprises an external distance measurement device of a passive type or the like and measures the distance by switching between distance measurement and contrast detection or performing the two operations.

A conventional technique of performing distance measurement by switching between distance measurement and contrast detection or performing the two operations is disclosed in, e.g., Japanese Patent Laid-Open Nos. 5-119250, 2000-111792, and 2003-107333.

Japanese Patent Laid-Open No. 5-119250 discloses the following technique.

Both autofocusing using contrast detection and autofocusing using infrared detection are employed. In normal photographing operation, the focus is adjusted by an autofocusing apparatus using contrast detection. In only a photographing environment in which it becomes difficult to execute focusing operation by the autofocusing apparatus using contrast detection, the autofocusing apparatus is switched to an autofocusing means using infrared detection, and distance measurement operation and autofocusing operation are done for a desired object. This technique can realize proper autofocusing regardless of the brightness of the object.

Japanese Patent Laid-Open No. 2000-111792 discloses the following technique.

This technique employs both an autofocusing means using contrast detection of photoelectrically converting an object image to generate an image signal, detecting a predetermined high-frequency component from the generated image signal, and adjusting the focus, and an autofocusing means using infrared detection of receiving light reflected by an object from a light-emitting means (LED) which emits infrared rays, and detecting an output signal corresponding to the object distance. Autofocusing operation is performed by selecting either the autofocusing means using contrast detection or the autofocusing means using infrared detection in accordance with an output from a temperature detection means for detecting the ambient temperature. This technique can execute appropriate autofocusing regardless of a change in the temperature of the use environment.

Japanese Patent Laid-Open No. 2003-107333 discloses the following technique.

The purpose of this reference is "to provide an autofocusing apparatus and method excellent in both the response characteristic and precision". The solving means is "an autofocusing apparatus for an image sensing element, comprising distance measurement means for detecting a distance to an object, lens driving means for driving a photographing lens of an image sensing apparatus, focus detection means for detecting a focus of the object by using an image sensor of the image sensing apparatus, correction means for correcting the lens driving means in accordance with a focus detection result of the focus detection means, and determination means for determining effectiveness of the correction means".

However, in Japanese Patent Laid-Open No. 5-119250, autofocusing operation is done by the autofocusing means using contrast detection in normal photographing operation, and thus the autofocusing speed cannot be increased in normal photographing operation. When the autofocusing means is switched to one using infrared detection in only a photographing environment in which it becomes difficult to execute autofocusing operation by the autofocusing apparatus using contrast detection, a satisfactory precision of autofocusing operation cannot be obtained.

In Japanese Patent Laid-Open No. 2000-111792, either the autofocusing means using contrast detection or the autofocusing means using infrared detection is selected in accordance with a change in the temperature of the use environment. This technique also suffers the same problems as those of Japanese Patent Laid-Open No. 5-119250.

Japanese Patent Laid-Open No. 2003-107333 discloses the technique which corrects the lens driving means in accordance with the focus detection result of the focus detection means and employs the determination means for determining effectiveness of the correction. However, this reference does not provide any solution to noncoincidence between the detection regions of the distance measurement means and focus detection means that is caused b parallax, and any solution to unbalance between the detection precisions of the distance measurement means and focus detection means.

SUMMARY OF THE INVENTION

The present invention has been made to overcome the conventional drawbacks, and has as its object to increase the precision and speed of autofocusing operation.

To solve the above problems and achieve the above objects, according to the first aspect of the present invention, an image sensing apparatus is comprising a photographing optical system which forms an object image, the photographing optical system having a focusing optical system which adjusts an imaging position of the object image, an image sensing element which photoelectrically converts the object image formed by the photographing optical system to generate an electrical image signal, an in-focus position detection device which detects an in-focus position of the focusing optical system for forming the object image on the image sensing element, on the basis of the image signal generated by the image sensing element while the focusing optical system adjusts the imaging position of the object image, and a distance measurement device which has a light-receiving device for receiving a beam from an object, and measures a distance to the object on the basis of an output signal from the light-receiving device, wherein a detection range for detecting a further in-focus position in the in-focus position detection device is controlled in accordance with a measurement result of the distance measurement device.

According to the second aspect of the present invention, an image sensing apparatus is comprising a photographing optical system which forms an object image, the photographing optical system having a focusing optical system which adjusts an imaging position of the object image, an image sensing element which photoelectrically converts the object image formed by the photographing optical system to generate an electrical image signal, an in-focus position detection device which detects an in-focus position of the focusing optical system for forming the object image on the image sensing element, on the basis of the image signal generated by the image sensing element while the focusing optical system adjusts the imaging position of the object image, a distance measurement device which has a light-receiving device for receiving a beam from an object, and measures a distance to the object on the basis of an output signal from the light-receiving device, and an arithmetic device which corrects a distance measurement result of the distance measurement device on the basis of detection results of the in-focus position detection device and the distance measurement device, wherein an object distance range within which detection ranges of the in-focus position detection device and the distance measurement device are regarded to coincide with each other is controlled in accordance with a correction result of the arithmetic device.

According to the third aspect of the present invention, an image sensing apparatus control method of controlling an image sensing apparatus having a photographing optical system which forms an object image, the photographing optical system having a focusing optical system which adjusts an imaging position of the object image, an image sensing element which photoelectrically converts the object image formed by the photographing optical system to generate an electrical image signal, an in-focus position detection device which detects an in-focus position of the focusing optical system for forming the object image, on the image sensing element on the basis of the image signal generated by the image sensing element while the focusing optical system adjusts the imaging position of the object image, and a distance measurement device which has a plurality of light-receiving devices for receiving a beam from an object, and measures a distance to the object on the basis of output signals from the light-receiving devices is comprising a measurement step of causing the distance measurement device to measure the distance to the object, wherein a detection range for detecting a further in-focus position in the in-focus position detection device is controlled in accordance with a measurement result of the distance measurement device.

According to the fourth aspect of the present invention, an image sensing apparatus control method of controlling an image sensing apparatus having a photographing optical system which forms an object image, the photographing optical system having a focusing optical system which adjusts an imaging position of the object image, an image sensing element which photoelectrically converts the object image formed by the photographing optical system to generate an electrical image signal, an in-focus position detection device which detects an in-focus position of the focusing optical system for forming the object image on the image sensing element, on the basis of the image signal generated by the image sensing element while the focusing optical system adjusts the imaging position of the object image, and a distance measurement device which has a plurality of light-receiving devices for receiving a beam from an object, and measures a distance to the object on the basis of output signals from the light-receiving devices is comprising an arithmetic step of correcting a distance measurement result of the distance measurement device on the basis of detection results of the in-focus position detection device and the distance measurement device, wherein an object distance range within which detection ranges of the in-focus position detection device and the distance measurement device are regarded to coincide with each other is controlled in accordance with a correction result in the arithmetic step.

According to the fifth aspect of the present invention, a program is characterized by causing a computer to execute the image sensing apparatus control method.

According to the sixth aspect of the present invention, a storage medium is characterized by computer-readably storing the program.

According to the seventh aspect of the present invention, an image sensing apparatus is comprising a photographing optical system which forms an object image, the photographing optical system having a focusing optical system which adjusts an imaging position of the object image and a zoom optical system for changing a view angle of a photographing frame, an image sensing element which photoelectrically converts the object image formed by the photographing optical system to generate an electrical image signal, an in-focus position detection device which detects an in-focus position of the focusing optical system for forming the object image on the image sensing element, on the basis of the image signal generated by the image sensing element while the focusing optical system adjusts the imaging position of the object image, a distance measurement device which has a light-receiving device for receiving a beam from an object, and measures a distance to the object on the basis of an output signal from the light-receiving device, and an arithmetic device which corrects a distance measurement result of the distance measurement device on the basis of detection results of the in-focus position detection device and the distance measurement device, wherein when a zoom position of the zoom optical system in distance measurement operation by the distance measurement device is closer to a telephoto side by not less than a predetermined value than a zoom position in immediately preceding in-focus position detection by the in-focus position detection device, correction of the distance measurement result of the distance measurement device is inhibited.

According to the eighth aspect of the present invention, an image sensing apparatus is comprising a photographing optical system which forms an object image, the photographing optical system having a focusing optical system which adjusts an imaging position of the object image and a zoom optical system for changing a view angle of a photographing frame, an image sensing element which photoelectrically converts the object image formed by the photographing optical system to generate an electrical image signal, an in-focus position detection device which detects an in-focus position of the focusing optical system for forming the object image on the image sensing element, on the basis of the image signal generated by the image sensing element while the focusing optical system adjusts the imaging position of the object image, a distance measurement device which has a light-receiving device for receiving a beam from an object, and measures a distance to the object on the basis of an output signal from the light-receiving device, and an arithmetic device which corrects a distance measurement result of the distance measurement device on the basis of detection results of the in-focus position detection device and the distance measurement device, wherein when a zoom position obtained when in-focus position detection by the in-focus position detection device is performed immediately preceding to distance measurement operation by the distance measurement device is closer to a wide-angle side by a predetermined value, correction of the distance measurement result of the distance measurement device is inhibited.

According to the ninth aspect of the present invention, an image sensing apparatus is comprising a photographing optical system which forms an object image, the photographing optical system having a focusing optical system which adjusts an imaging position of the object image, a zoom optical system for changing a view angle of a photographing frame, and a macro function capable of near-distance photographing, an image sensing element which photoelectrically converts the object image formed by the photographing optical system to generate an electrical image signal, an in-focus position detection device which detects an in-focus position of the focusing optical system for forming the object image on the image sensing element, on the basis of the image signal generated by the image sensing element while the focusing optical system adjusts the imaging position of the object image, a distance measurement device which has a light-receiving device for receiving a beam from an object, and measures a distance to the object on the basis of an output signal from the light-receiving device, and an arithmetic device which corrects a distance measurement result of the distance measurement device on the basis of detection results of the in-focus position detection device and the distance measurement device, wherein when a macro/non-macro setting of the macro function changes between distance measurement operation by the distance measurement device and immediately preceding in-focus position detection by the in-focus position detection device, correction of the distance measurement result of the distance measurement device is inhibited.

According to the 10th aspect of the present invention, a method of controlling an image sensing apparatus having a photographing optical system which forms an object image, the photographing optical system having a focusing optical system which adjusts an imaging position of the object image and a zoom optical system for changing a view angle of a photographing frame, an image sensing element which photoelectrically converts the object image formed by the photographing optical system to generate an electrical image signal, an in-focus position detection device which detects an in-focus position of the focusing optical system for forming the object image on the image sensing element, on the basis of the image signal generated by the image sensing element while the focusing optical system adjusts the imaging position of the object image, and a distance measurement device which has a light-receiving device for receiving a beam from an object, and measures a distance to the object on the basis of an output signal from the light-receiving device is comprising an arithmetic step of correcting a distance measurement result of the distance measurement device on the basis of detection results of the in-focus position detection device and the distance measurement device, wherein when a zoom position of the zoom optical system in distance measurement operation by the distance measurement device is closer to a telephoto side by not less than a predetermined value than a zoom position in immediately preceding in-focus position detection by the in-focus position detection device, correction of the distance measurement result of the distance measurement device is inhibited.

According to the 11th aspect of the present invention, a method of controlling an image sensing apparatus having a photographing optical system which forms an object image, the photographing optical system having a focusing optical system which adjusts an imaging position of the object image and a zoom optical system for changing a view angle of a photographing frame, an image sensing element which photoelectrically converts the object image formed by the photographing optical system to generate an electrical image signal, an in-focus position detection device which detects an in-focus position of the focusing optical system for forming the object image on the image sensing element, on the basis of the image signal generated by the image sensing element while the focusing optical system adjusts the imaging position of the object image, and a distance measurement device which has a light-receiving device for receiving a beam from an object, and measures a distance to the object on the basis of an output signal from the light-receiving device is comprising an arithmetic step of correcting a distance measurement result of the distance measurement device on the basis of detection results of the in-focus position detection device and the distance measurement device, wherein when a zoom position obtained when in-focus position detection by the in-focus position detection device is performed immediately preceding to distance measurement operation by the distance measurement device is closer to a wide-angle side by a predetermined value, correction of the distance measurement result of the distance measurement device is inhibited.

According to the 12th aspect of the present invention, a method of controlling an image sensing apparatus having a photographing optical system which forms an object image, the photographing optical system having a focusing optical system which adjusts an imaging position of the object image, a zoom optical system for changing a view angle of a photographing frame, and a macro function capable of near-distance photographing, an image sensing element which photoelectrically converts the object image formed by the photographing optical system to generate an electrical image signal, an in-focus position detection device which detects an in-focus position of the focusing optical system for forming the object image on the image sensing element, on the basis of the image signal generated by the image sensing element while the focusing optical system adjusts the imaging position of the object image, and a distance measurement device which has a light-receiving device for receiving a beam from an object, and measures a distance to the object on the basis of an output signal from the light-receiving device is comprising an arithmetic step of correcting a distance measurement result of the distance measurement device on the basis of detection results of the in-focus position detection device and the distance measurement device, wherein when a macro/non-macro setting of the macro function changes between distance measurement operation by the distance measurement device and immediately preceding in-focus position detection by the in-focus position detection device, correction of the distance measurement result of the distance measurement device is inhibited.

According to the 13th aspect of the present invention, a program is characterized by causing a computer to execute the image sensing apparatus control method.

According to the 14th aspect of the present invention, a storage medium is characterized by computer-readably storing the program.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 7 is a flowchart showing image sensing operation of an image sensing apparatus according to the third embodiment; and FIG. 8 is a flowchart of conditions for correcting the result of passive AF by the result of immediately preceding scan AF.

DETAILED DESCRIPTION OF THE PREFERRED EMBODIMENTS

Preferred embodiments of the present invention will be described below with reference to the accompanying drawings.

First Embodiment

Figure 1:
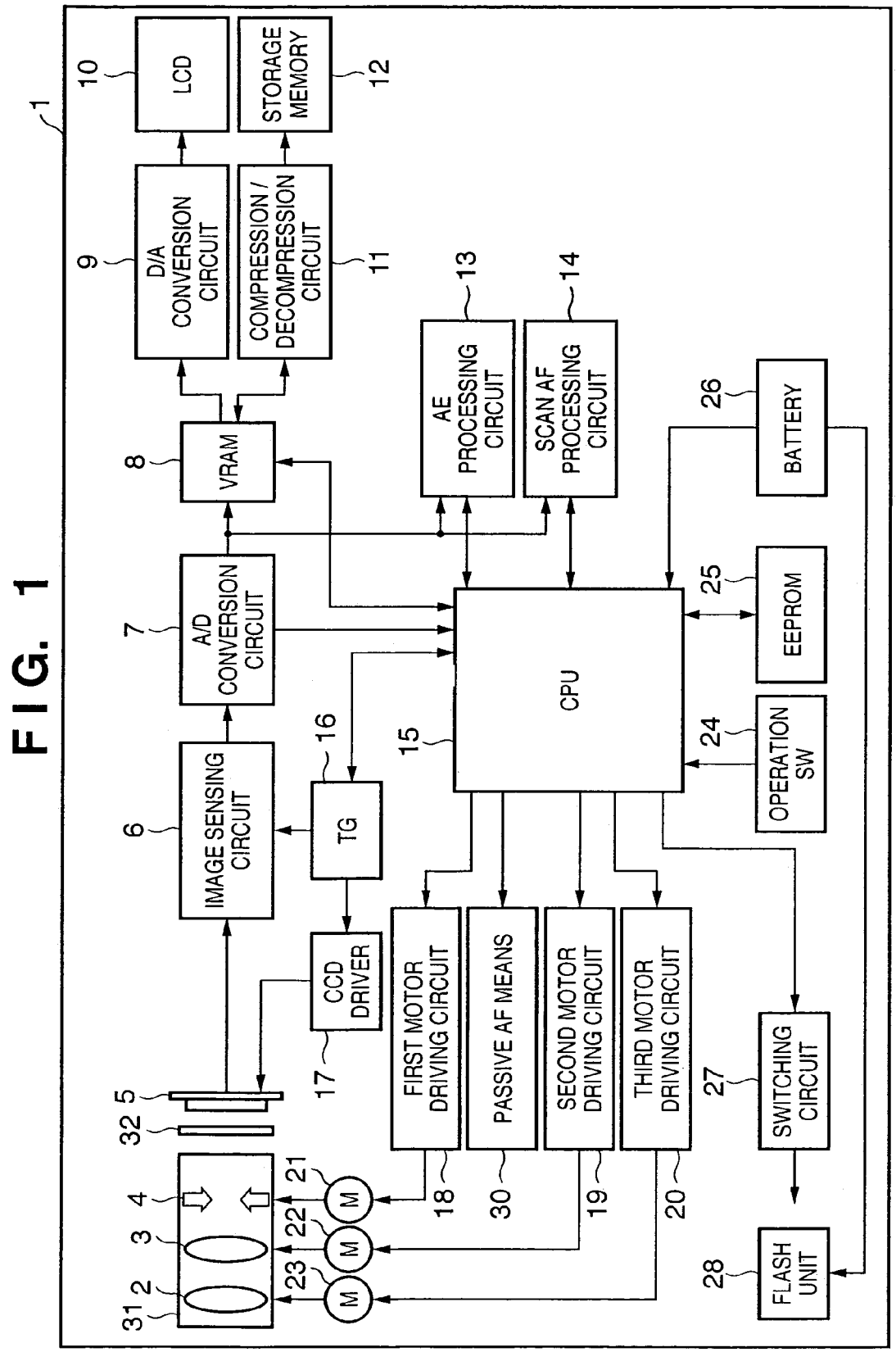
FIG. 1 is a block diagram showing the configuration of an image sensing apparatus according to the first embodiment of the present invention.

FIG. 1 is a block diagram showing the configuration of an image sensing apparatus according to the first embodiment of the present invention.

In FIG. 1, reference numeral 1 denotes an image sensing apparatus; 2, a zoom lens group; 3, a focus lens group; 4, a stop serving as an exposure device and also a light quantity adjustment device which controls the quantity of a beam having passed through a photographing optical system formed from the zoom lens group 2, focus lens group 3, and the like; 31, a photographing lens barrel which incorporates the zoom lens group 2, focus lens group 3, stop 4, and the like; and 5, a solid-state image sensing element (to be referred to as a CCD hereinafter) such as a CCD which forms an object image having passed through the photographing optical system and photoelectrically converts the object image.

Reference numeral 6 denotes an image sensing circuit which receives an electrical signal photoelectrically converted by the CCD 5 and performs various image processes to generate a predetermined image signal; 7, an A/D conversion circuit which converts an analog image signal generated by the image sensing circuit 6 into a digital image signal; 8, a memory (VRAM) such as a buffer memory which receives an output from the A/D conversion circuit 7 and temporarily stores the image signal; 9, a D/A conversion circuit which reads out an image signal from the VRAM 8, converts it into an analog signal, and converts the signal into an image signal of a format suitable for playback output; 10, an image display device (to be referred to as an LCD hereinafter) such as a liquid crystal display (LCD) which displays an image signal; 12, a storage memory which is formed from a semiconductor memory or the like and stores image data; and 11, a compression/decompression circuit formed from a compression circuit which performs a compression process and encoding process for image data in order to read out an image signal temporarily stored in the VRAM 8 and convert it into a format suitable for storage in the storage memory 12, and a decompression circuit which performs a decoding process, decompression process, and the like in order to convert image data stored in the storage memory 12 into a format optimal for playback display or the like.

Reference numeral 13 denotes an AE processing circuit which receives an output from the A/D conversion circuit 7 and performs an autoexposure (AE) process; 14, a scan AF processing circuit which receives an output from the A/D conversion circuit 7 and performs an autofocusing (AF) process; 15, a CPU which controls the image sensing apparatus and incorporates an arithmetic memory; 16, a timing generator (to be referred to as a TG hereinafter) which generates a predetermined timing signal; and 17, a CCD driver.

Reference numeral 21 denotes a stop driving motor which drives the stop 4; 18, a first motor driving circuit which controls the stop driving motor 21; 22, a focus driving motor which drives the focus lens group 3; 19, a second motor driving circuit which drives and controls the focus driving motor 22; 23, a zoom driving motor which drives the zoom lens group 2; and 20, a third motor driving circuit which drives and controls the zoom driving motor 23.

Reference numeral 24 denotes an operation switch including various switches; 25, an EEPROM serving as an electrically programmable read only memory which stores in advance programs for various control operations and the like, data used to perform various operations, and the like; 26, a battery; 28, a flash unit; 27, a switching circuit which controls flash emission of the flash unit 28; 30, an external distance measurement device of a passive type (to be referred to as a passive AF device hereinafter) having a plurality of light-receiving portions for receiving a plurality of beams from an object; and 32, an iR cut filter which cuts off infrared rays.

In the first embodiment, the CPU 15 performs calculation of obtaining a distance to an object from an output from the light-receiving portion of the passive AF device 30. A drawing showing the hardware configuration illustrates, as the passive AF device, a light-receiving lens which receives a beam from an object, an image sensor such as a CCD which converts the object image into an electrical signal, a driver which drives the sensor, and the like. In actual operation, the passive AF device is formed from the passive AF device 30 shown in FIG. 1 and the CPU 15 having an A/D conversion terminal. The passive AF device is arranged so that the direction of base length of the passive AF device coincides with a direction perpendicular to the optical axis of the photographing optical system incorporated in the photographing lens barrel 31.

Also in the description of the first embodiment, the passive AF device includes the CPU. The storage memory serving as a storage medium for image data and the like can take various forms such as a fixed semiconductor memory (e.g., flash memory), a semiconductor memory (e.g., card type flash memory) which is shaped into a card or stick and is freely detachable from an apparatus, and a magnetic storage medium (e.g., hard disk or floppy® disk).

The operation switch 24 includes a main power switch for activating the image sensing apparatus 1 and supplying power, a shutter button for starting photographing operation (storage operation) and the like, a playback switch for starting playback operation, and a zoom switch for moving the zoom lens group 2 of the photographing optical system and zooming.

The shutter button is formed from a two-step switch having the first stroke which generates an instruction signal for starting an AE process and AF process executed prior to photographing operation, and the second stroke which generates an instruction signal for starting actual exposure operation.

The operation of the image sensing apparatus having the above configuration according to the first embodiment will be explained.

The light quantity of an object beam having passed through the photographing lens barrel 31 of the image sensing apparatus 1 is adjusted by the stop 4, and then the object image is formed on the light-receiving surface of the CCD 5. The object image is converted into an electrical signal by a photoelectric conversion process by the CCD 5, and the electrical signal is output to the image sensing circuit 6. The image sensing circuit 6 performs various signal processes for the input signal to generate a predetermined image signal. The image signal is output to the A/D conversion circuit 7 and converted into a digital signal, and the digital signal is temporarily stored in the VRAM 8.

The image data stored in the VRAM 8 is output to the D/A conversion circuit 9, converted into an analog signal, and then converted into an image signal of a format suitable for display. The resultant image signal is displayed as an image on the LCD 10. The image data stored in the VRAM 8 is also output to the compression/decompression circuit 11. The image data is compressed by the compression circuit of the compression/decompression circuit 11, and converted into image data of a format suitable for storage. The resultant image data is stored in the storage memory 12.

When, for example, the playback switch (not shown) of the operation switch 24 is operated and turned on, playback operation starts. The compressed image data stored in the storage memory 12 is then input to the compression/decompression circuit 11, and undergoes a decoding process, decompression process, and the like by the decompression circuit. The resultant image data is input to the VRAM 8 and temporarily stored. The image data is further input to the D/A conversion circuit 9, converted into an analog signal, and converted into an image signal of a format suitable for display. The resultant signal is displayed as an image on the LCD 10.

Image data digitized by the A/D conversion circuit 7 is output to the AE processing circuit 13 and scan AF processing circuit 14 separately from the VRAM 8. The AE processing circuit 13 receives the input digital image signal, and executes an arithmetic process such as cumulation for the luminance value of image data of one frame. As a result, an AE evaluation value corresponding to the brightness of the object is calculated. The AE evaluation value is output to the CPU 15.

The scan AF processing circuit 14 receives the input digital image signal, extracts via a high-pass filter (HPF) or the like the high-frequency component of image data corresponding to the AF frame of the image, and executes an arithmetic process such as cumulation. As a result, an AF evaluation value corresponding to an edge component amount on the high-frequency side or the like is calculated. In this manner, the scan AF processing circuit 14 functions as a high-frequency component detection device for detecting a predetermined high-frequency component from an image signal generated by the CCD 5 during the AF process.

The TG 16 outputs predetermined timing signals to the CPU 15, image sensing circuit 6, and CCD driver 17. The CPU 15 performs various control operations in synchronism with the timing signal. The image sensing circuit 6 receives the timing signal from the TG 16, and performs various image processes such as color signal separation in synchronism with the timing signal. The CCD driver 17 receives the timing signal from the TG 16, and drives the CCD 5 in synchronism with the timing signal.

The CPU 15 controls the first motor driving circuit 18, second motor driving circuit 19, and third motor driving circuit 20 to drive and control the stop 4, focus lens group 3, and zoom lens group 2 via the stop driving motor 21, focus driving motor 22, and zoom driving motor 23. More specifically, the CPU 15 controls the first motor driving circuit 18 on the basis of an AE evaluation value calculated by the AE processing circuit 13 or the like, drives the stop driving motor 21, and performs AE control of adjusting the F-number of the stop 4 to a proper value. Also, the CPU 15 controls the second motor driving circuit 19 on the basis of an AF evaluation value calculated by the scan AF processing circuit 14 or an output obtained by the passive AF device (to be described later), drives the focus driving motor 22, and performs AF control of moving the focus lens group 3 to the in-focus position. When the zoom switch (not shown) of the operation switch 24 is operated, the CPU 15 controls the third motor driving circuit 20 in response to the operation, drives and controls the zoom motor 23 to move the zoom lens group 2, and achieves zooming operation of the photographing optical system.

Figure 2:
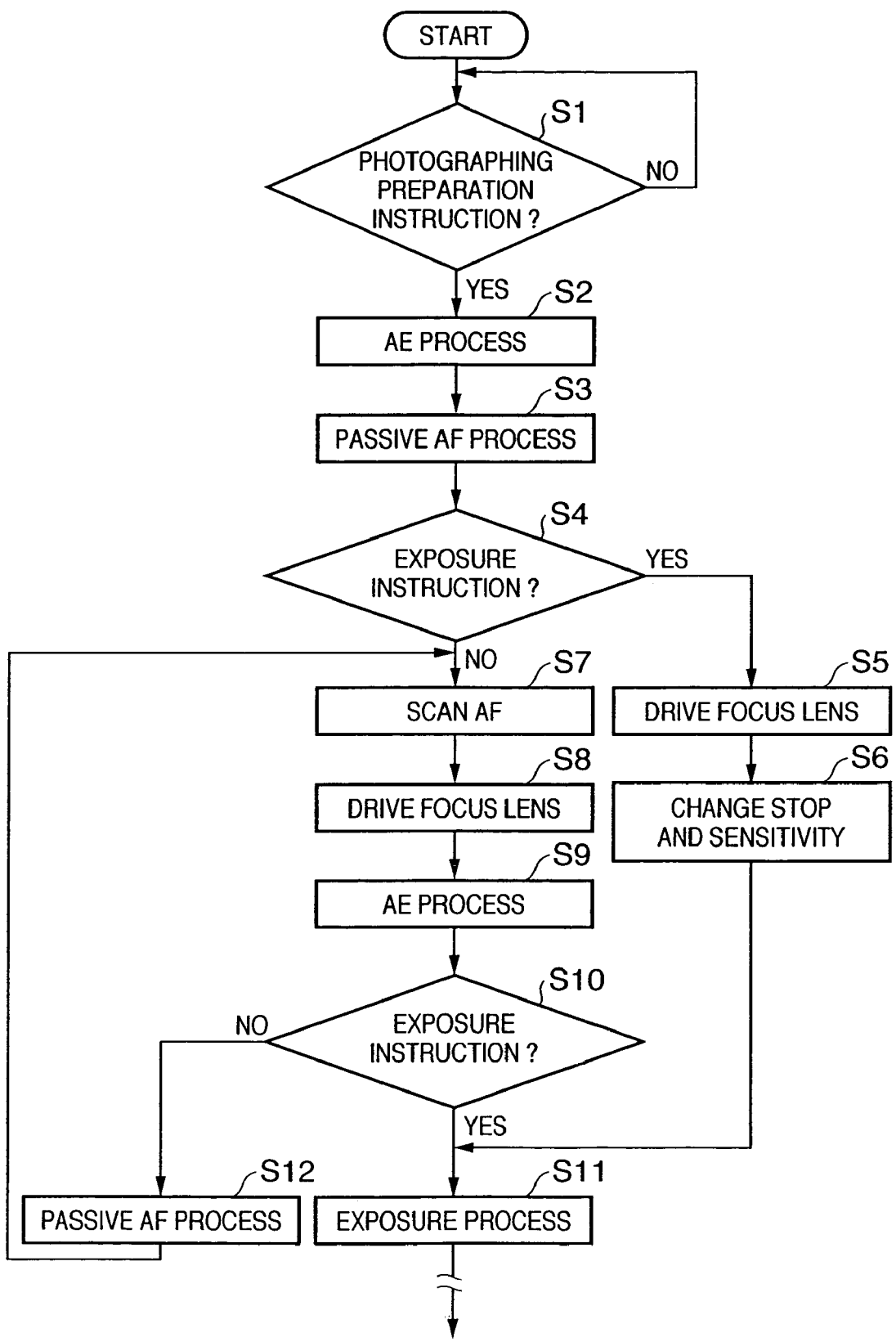
FIG. 2 is a flowchart showing image sensing operation of the image sensing apparatus according to the first embodiment.

Actual photographing operation of the image sensing apparatus will be explained with reference to the flowchart shown in FIG. 2.

A photographing process sequence is executed when the main power switch of the image sensing apparatus 1 is ON and the operation mode of the image sensing apparatus is the photographing (recording) mode.

The CPU 15 displays as an image on the LCD 10 an image which has passed through the photographing lens barrel 31 and is formed on the CCD 5. In step S1, the CPU 15 confirms the state of the shutter button. If the CPU 15 recognizes an instruction signal for starting an AE process and AF process prior to photographing operation upon operation to the shutter button by the photographer, the flow advances to step S2 to execute a general AE process.

In step S3, a passive AF process is done. The CPU 15 controls the passive AF device 30, and reads out images formed on the sensors of the passive AF device 30 on the basis of two beams received from the object. The two readout image signals are A/D-converted, and then input to the CPU 15. The CPU 15 calculates the image shift amount from the two image signals, and a distance to the object.

A method of calculating a distance to the object will be briefly explained.

Figure 3:
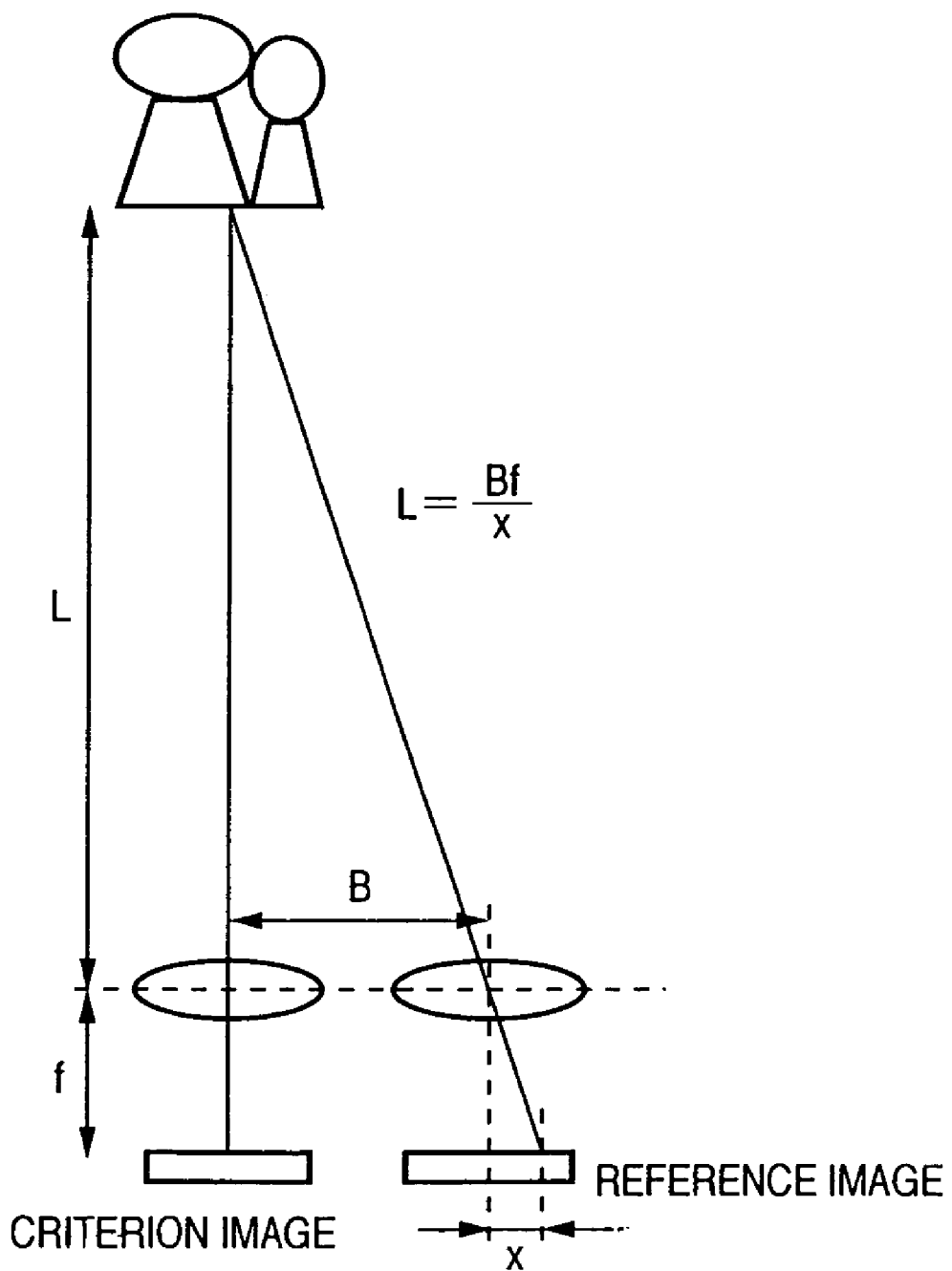
FIG. 3 is an explanatory view of the principle of passive AF.

As shown in FIG. 3, letting x be the image shift amount between two images formed on right and left sensors, a distance L to the object is given from the triangulation principle:

$$L = B \cdot f / x \tag{1}$$

where f is the focal length of the light-receiving lens, and B is the base length (interval between the two light-receiving lenses). B·f will be described as Bf and referred to as the Bf product.

In calculation of the image shift amount, when either the right or left image is defined as a criterion image and the other is defined as a reference image, the read start pixel of the reference image is displaced, the correlation value between the criterion image and the reference image is calculated, and a position at which the correlation value minimizes is detected. The position at which the correlation value minimizes exhibits the image shift amount between the right and left images. Actual calculation is done as follows because a shift amount smaller than the pixel of the sensor is obtained by interpolation calculation.

As shown in FIG. 3, an image output from a left sensor array is defined as a criterion image, and an image output from a right sensor array is defined as a reference image. On the reference image side, a larger number of pixels than those on the criterion image side must be read out. Let N be the number of pixels of each of the left and right sensors, NLeft be the number of read pixels of the criterion image (left), and NRight (NLeft<NRight) be the number of read pixels of the reference image (right). The difference between NLeft and NRight depends on setting of the shift amount, that is, is determined by the range of distance measurement on the near side. For example, when the Bf product is 32.6 mm², the measurement distance on the near side is 20 cm, and the sensor pitch is 7 μm, NRight−NLeft=23.3 pixels, and the difference must be equal to or larger than 23.3 pixels. In order to obtain a satisfactory precision in correlation calculation, at least about 40 pixels are necessary as pixels on the criterion image side. Hence, NLeft=50 pixels and NRight=80 pixels are set for a passive AF device having two sensor arrays each with N=100. The correlation value between two images is calculated as follows. Letting Uk be the correlation value when the signal of a reference image is shifted by k bits, $$Uk = \Sigma \min(a_{j+1}, b_{j+k}) - \Sigma \min(a_j, b_{j+k+1}) \quad (2)$$

where min(x,y) is calculation of selecting a smaller one of x and y, $a_j$ is the signal of a criterion image, and $b_j$ is the signal of a reference image. The parameters k and j range as follows.

Letting N be the total number of pixels of each of the left and right sensors, NLeft be the number of read pixels of the criterion image (left), and NRight be the number of read pixels of the reference image (right), a read start pixel MLo of the criterion image and a read start pixel MRo of the reference image are given by $$MLo = (N - NLeft)/2$$

$$MRo = (N - NRight)/2 - \Delta N$$

where ΔN is the constant which is about 1/20 of N. The ΔN value changes depending on the specifications of the passive AF device such as the base length, the focal length of the light-receiving lens, and the sensor pitch. An NLeft pixel at the center of the sensor is loaded for the criterion image, and an NRight pixel in an externally wider range containing the criterion image is loaded for the reference image. For example, for N=100, NLeft=50 pixels, and NRight=80 pixels, MLo=25 pixels and MRo=10 pixels.

When pixels are read from the sensors in this way, the ranges of k and j in equation (2) are given by $$k = -\Delta N \sim NRight - NLeft - \Delta N$$

$$j = 1 \sim NLeft$$

Uk is calculated in the above fashion, and k at which the sign of Uk is reversed is obtained within the range of k. If the sign is reversed between k=p and K=p+1, an image shift amount δ is $$\delta = |Up|/(|Up| + |Up+1|) + p \quad (3)$$

The distance L is obtained from the image shift amount on the basis of the triangulation principle. Since x in equation (1) represents the difference from the image shift amount of an object at infinity, the distance L is actually given by $$L = Bf/(\delta - \delta\infty) \quad (1)$$

where δ ∞ is the image shift amount of an object at infinity. Since δ ∞ and Bf change for each passive AF device, not a design value but a value measured in a step or the like is used.

In this manner, the distance L to the object can be attained.

After the distance measurement result by the passive AF device is attained, the CPU 15 obtains a set value representing the position of the focus lens group 3 that corresponds to the distance attained by the passive AF device, and defines the set value as an in-focus position G1 of passive AF.

In step S4, an exposure instruction (second stroke of the shutter button) is confirmed.

If exposure is designated, the flow advances to step S5 to drive the focus lens group 3 to the in-focus position G1 obtained in the passive AF process of step S3. In step S6, the CPU 15 controls the first motor driving circuit 18 to drive and control the stop 4 to a larger F-number via the stop driving motor 21. As a result, the depth of field-becomes larger, and the error of the in-focus position by passive AF is absorbed. The accumulation time of the CCD 5 that is set in step S2 is prolonged by the stop-down amount of the stop 4, so the exposure amount does not run short after stopping down the stop 4. If prolongation of the accumulation time may cause camera shake or the like and adversely affect the image quality, the sensitivity of the CCD 5 is increased without prolonging the accumulation time. An increase in sensitivity leads to an increase in noise, and thus the sensitivity is increased after the accumulation time is prolonged up to a value at which no camera shake occurs.

Thereafter, the flow advances to step S11 to execute an actual exposure process in accordance with the settings in step S6.

If no exposure is designated, the flow advances to step S7 to execute scan AF.

When scan AF is performed, the passive AF process functions as an AF process for coarse adjustment of detecting an approximate distance (in-focus position of the focus lens group 3) to a desired object. The scan AF process functions as a process for fine adjustment of detecting an accurate in-focus position.

More specifically, the CPU 15 moves the focus lens group 3 close to the in-focus position obtained from the distance measurement result of the passive AF process in step S3. In step S8, the CPU 15 performs a scan AF process for fine adjustment of detecting an accurate in-focus position. In this case, while the focus lens group 3 is finely driven, an output from the scan AF processing circuit is monitored to obtain the position of the focus lens group 3 at which a high-frequency component output from an image signal generated by the CCD 5 maximizes.

In step S8, the focus lens group 3 is driven to the in-focus position.

After the predetermined AF process ends, the AE process is executed again. In step S10, the CPU 15 confirms an exposure instruction (second stroke of the shutter button). If exposure is designated, the flow advances to step S11 to execute an actual exposure process.

If exposure is designated during the scan AF process, the flow advances to step S11 after the end of the scan AF process (steps S7 and S8) to execute an actual exposure process.

If no exposure is designated in step S10, the flow advances to step S12 to perform the passive AF process again. In the passive AF process, the distance measurement result is corrected using the result of immediately preceding scan AF.

Details of correction will be described.

The reason of performing correction is to increase the distance measurement precision of the external distance measurement device (passive AF device) even upon variations in temperature or the like and thereby widen a distance range which is generated by parallax between the external distance measurement device and the photographing optical system, and allows determining the distance measurement result of the external distance measurement device to be effective.

As is well known, parallax occurs between the external distance measurement device and the photographing optical system when the external distance measurement device is used. This also applies to the embodiment.

Scan AF is done using part of an image signal generated by the CCD 5. The range of part of the image signal is set to the central portion of the frame, and will be called a scan AF frame. The scan AF frame and the distance measurement range of the external distance measurement device do not coincide with each other except a range within which they are made to coincide with each other. The range within which the scan AF frame and the distance measurement range are regarded to coincide with each other changes depending on the focal length of the photographing lens. In the first embodiment, when the center of the distance measurement range of the passive AF device falls within the range of the scan AF frame, their distance measurement ranges are regarded to coincide with each other.

If the distance measurement ranges coincide with each other, the same object is subjected to distance measurement. Thus, an AF process for coarse adjustment of detecting an approximate distance to a desired object can be done in the passive AF process, and a process for fine adjustment of detecting an accurate in-focus position can be done in the scan AF process. However, when these two distance measurement ranges do not coincide with each other, different objects may be subjected to distance measurement, and it is impossible to perform an AF process for coarse adjustment in the passive AF process and an AF process for fine adjustment in the scan AF process. In this case, the speed of autofocusing operation cannot be increased using both the passive AF process and scan AF process.

From the focal length (fT) of the photographing lens, the difference (dy) between the attaching position of the optical axis of the photographing lens and that of the passive AF device, the size ($W_{SAF}$) of the scan AF frame on the plane of the CCD 5, and the distance (Lo) by which the optical axis of the photographing lens and that of the light-receiving lens of the passive AF device cross each other, a near point Lnear and a far point Lfar within a distance range within which the two distance measurement ranges are regarded to coincide with each other are given by $$L\text{near}, L\text{far} = Lo/\{1 \pm W_{SAF}/(dy \cdot fT)\} \quad (11)$$

The distance range within which the two distance measurement ranges are regarded to coincide with each other will be called an effective passive AF distance measurement result range.

If the distance measurement result of the passive AF device falls within the effective passive AF distance measurement result range, the two distance measurement ranges are regarded to coincide with each other. However, the distance measurement result of the passive AF device has an error due to an environmental change in temperature or the like, the adjustment/assembly errors of the external distance measurement device and in-focus position detection device, and the like.

Thus, the effective passive AF distance measurement result range is set narrower than the range of equation (11) in consideration of the error. The near point Lnear and far point Lfar considering the error are given by $$L\text{near}, L\text{far} = Lo/[\{1 \pm W_{SAF}/(dy \cdot fT)\} \cdot \{1 \pm Bf/\Delta err\}] \quad (12)$$

where Bf is the Bf product of the passive AF device, and $\Delta err$ is the correction term resulting from the error factor. More specifically, $\Delta err$ is calculated by $$\Delta err = \sqrt{\{(\text{distance measurement error by temperature})^2 \\ + (\text{distance measurement error by adjustment error})^2 + (\text{distance measurement error by assembly error})^2\}}$$

If the distance measurement error of the passive AF device occurs, the effective passive AF distance measurement result range narrows, and the range within which the speed of autofocusing operation can be increased also narrows. To prevent this, the effective passive AF distance measurement result range is widened by correcting the distance measurement result by using the result of immediately preceding scan AF in the passive AF process.

Figure 4:
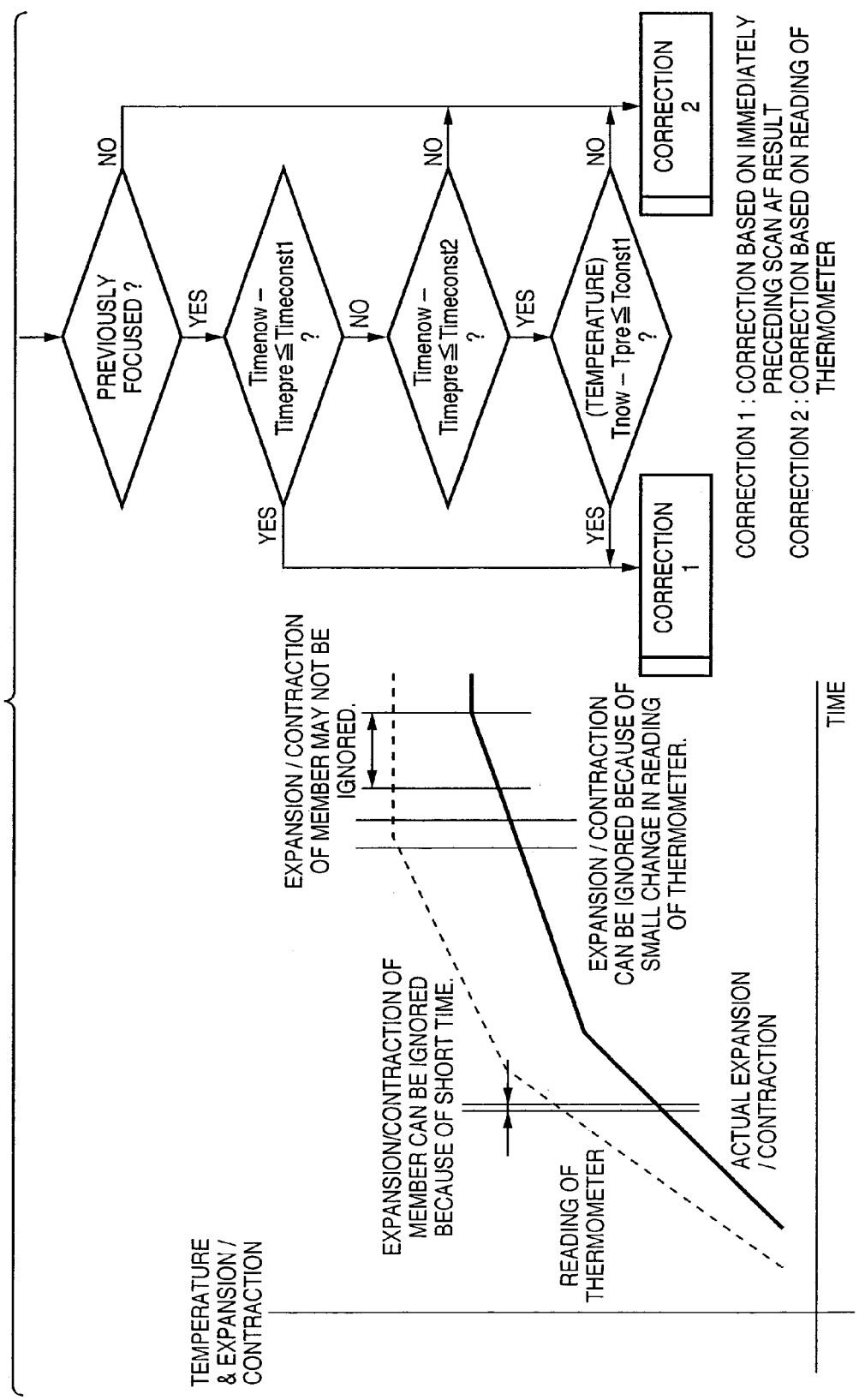
FIG. 4 is an explanatory view of conditions for correcting the result of passive AF by the result of immediately preceding scan AF.

A concrete correction method will be explained. FIG. 4 shows conditions for correcting the result of passive AF by the result of immediately preceding scan AF.

Whether the lens is focused as a result of immediately preceding scan AF is determined. If the lens is not focused, correction using the result of immediately preceding scan AF is not performed, but correction (to be described later) of the distance measurement result of the passive AF device using a temperature measured by a thermometer arranged near the passive AF device is done.

Time Timepre at which immediately preceding AF (both passive AF and scan AF) is done and current time Timenow are compared, and if the difference is equal to or smaller than a predetermined value Timeconst1, the flow advances to a process of correcting a distance measurement result by using the result of immediately preceding scan AF. In this case, even if the reading of the thermometer greatly changes, the reading changes only within a short time, and expansion/contraction of a member can be ignored.

If the time difference is larger than a predetermined value Timeconst2, correction of the distance measurement result of the passive AF device using a temperature measured by the thermometer is executed. In this case, even if a change in the reading of the thermometer is small, the situation may change, and expansion/contraction of a member may not be ignored.

If the time difference Timenow−Timepre satisfies Timeconst1<Timenow−Timepre≦Timeconst2, a temperature Tpre of preceding AF and a current temperature Tnow are compared. If the difference Tnow−Tpre is equal to or smaller than a predetermined value Tconst1, the flow advances to a process of correcting a distance measurement result by using the result of immediately preceding scan AF. This is because expansion/contraction of a member can be ignored when a change in the reading of the thermometer is small.

When Tnow−Tpre is larger than Tconst1, correction of the distance measurement result of the passive AF device using a temperature measured by the thermometer is done. This is because expansion/contraction of a member cannot be ignored when a change in the reading of the thermometer is large.

The process of correcting a distance measurement result by using the result of immediately preceding scan AF will be explained.

This process is performed when variations in temperature do not occur (can be ignored) in immediately preceding scan AF and current passive AF. The result of passive AF is corrected using information on the in-focus position by scan AF. Correction is done utilizing the difference between the result of immediately preceding passive AF and that of current passive AF.

Letting xcal be the result (prediction value) of passive AF which does not perform any correction by using the reading of the thermometer, xpre be the result (prediction value) of immediately preceding passive AF, and LpreTv be a value obtained by converting the result (in-focus position) of immediately preceding scan AF into a distance, a distance measurement result L corrected using the result of immediately preceding scan AF is given by $$L = Bf/(xcal + Bf/LpreTv - xpre)$$

where Bf is the Bf product described above.

This correction can absorb errors caused by an environmental change in temperature or the like, the adjustment/assembly errors of the external distance measurement device and in-focus position detection device, and the like. The near point Lnear and far point Lfar of the distance range within which the distance measurement ranges of the passive AF device and scan AF device are regarded to coincide with each other are given by $$Lnear, Lfar = Lo/\{1 \pm W_{SAF}/(dy \cdot fT)\} \quad (11)$$

From this, the effective range of the passive AF result also becomes wider.

By this correction, the influence of an environmental change in temperature or the like can be removed to increase the distance measurement precision of the passive AF device. The detection range for fine adjustment of detecting an accurate in-focus position in the scan AF process can be narrowed to increase the processing speed.

The process of correcting the distance measurement result of the passive AF device by using a temperature measured by the thermometer will be explained.

Letting xcal be the result (prediction value) of passive AF which does not perform any correction using the reading of the thermometer, an external measurement AF result xcorect after correction using the reading of the thermometer is given by $$xcorect = xcal + (Tg - Tadj) * \Delta xT$$

The distance L is given by $$L = Bf/xcorect$$

where Tg is the reading of the thermometer upon executing passive AF, Tadj is the reading of the thermometer upon measuring Bf in a step or the like, $\Delta xT$ is the temperature correction coefficient of the prediction value, and Bf is the Bf product described above.

In this case, the distance measurement precision of the passive AF device decreases under the influence of an environmental change in temperature or the like. The near point Lnear and far point Lfar of the distance range within which the distance measurement ranges of the passive AF device and scan AF device are regarded to coincide with each other-are given by $$Lnear, Lfar = Lo/[\{1 \pm W_{SAF}/(dy \cdot fT)\} \cdot \{1 \pm Bf/\Delta err\}]$$

Details of scan AF executed in step S7 of FIG. 2 will be described in detail.

Figure 5:
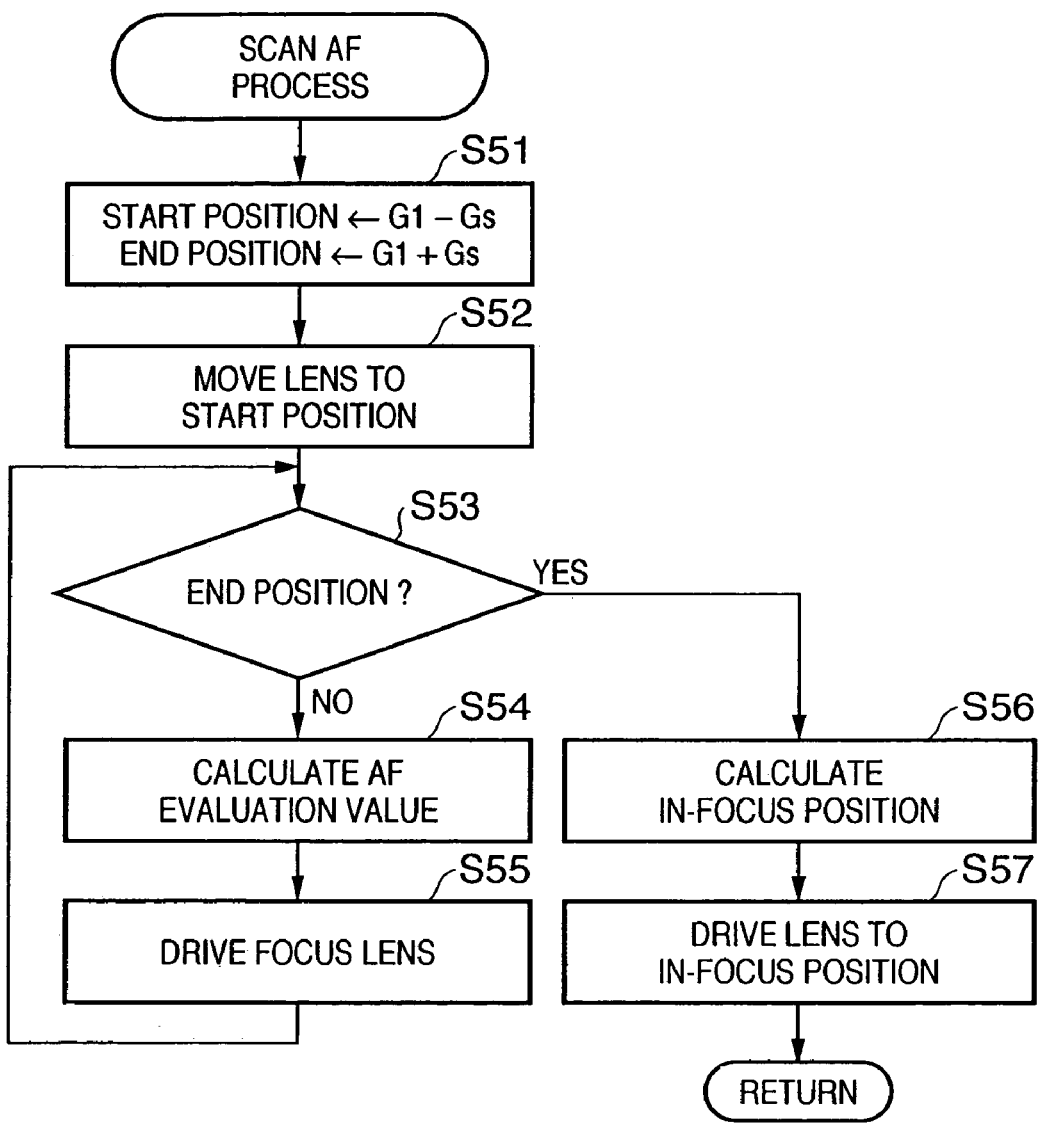
FIG. 5 is a flowchart showing scan AF operation.
Figure 6:
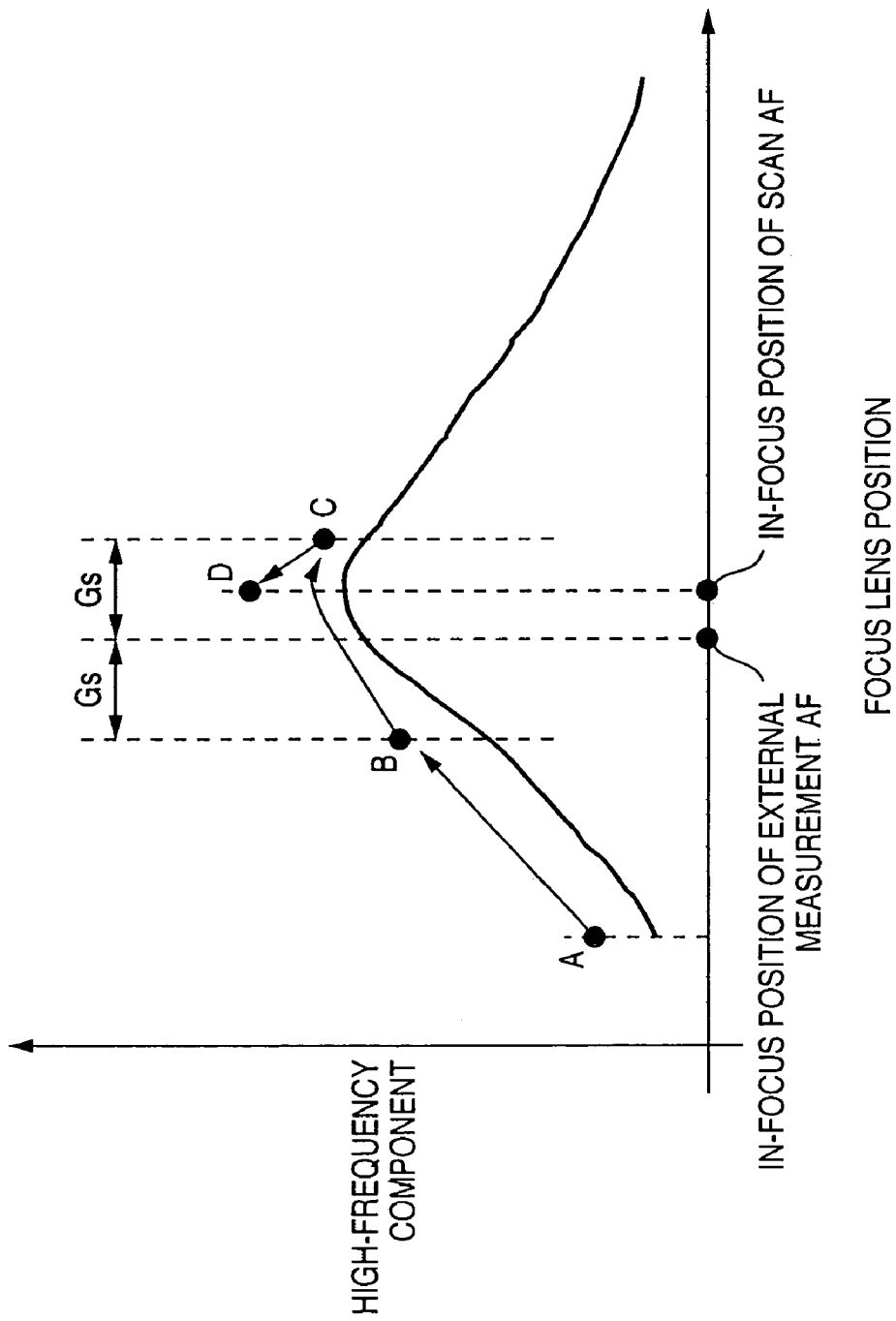
FIG. 6 is a graph showing the relationship between the high-frequency component amount and the focus lens position when scan AF is executed.

FIG. 5 shows the flowchart of the scan AF sequence. FIG. 6 shows the relationship between the high-frequency component amount and the focus lens position when scan AF is executed.

In step S51 of FIG. 5, the CPU 15 sets from a passive AF process calculation result a start position and stop position at which the focus lens group 3 is driven, in order to perform focal position detection operation by the scan AF process. The set value of the start position is prepared by subtracting a variable Gs from a passive AF in-focus position (set value representing the position of the focus lens group 3 that corresponds to the object distance of the passive AF process calculation result) G1. The set value of the stop position is prepared by adding the variable Gs to the passive AF in-focus position (set value representing the position of the focus lens group 3 that corresponds to the object distance of the passive AF process calculation result) G1. That is, the range within which scan AF is executed is a predetermined range centered on the object distance based on the passive AF process calculation result.

The variable Gs is determined in consideration of the focal length of the photographing lens, passive AF process calculation result (object distance), a distance measurement error assumed in the passive AF process, and the like.

When the value prepared by subtracting the variable Gs from G1 and the value prepared by adding the variable Gs to G1 exceed the driving range of the focus lens group 3, the focus lens group 3 is restricted within the driving range.

In general, focusing operation in the image sensing apparatus is to form an image in an in-focus state on the image sensing surface (light-receiving surface) of an image sensing element (such as a CCD) from a beam which travels from a desired object and is condensed by a photographing optical system. For this purpose, an in-focus state is obtained by moving the focus lens group serving as part of the photographing, optical system along the optical axis. The moving amount along the optical axis tends to increase as the object comes closer, and tends to increase as the focal length of the photographing lens becomes longer.

Distance measurement errors include the adjustment error of the image sensing apparatus in the manufacture, a temperature error such as distortion caused by a change in the ambient temperature of the photographing lens barrel 31, a distance measurement error caused by the mechanical error of each member which forms the passive AF device, and the moving error of the focus lens group 3.

The variable Gs is set in consideration of the distance measurement error in addition to a distance to the object that is obtained from a passive AF process calculation result and a value obtained from the focal length of the photographing lens.

In step S52, the CPU 15 drives the focus motor 22 via the second motor driving circuit 19, and moves the focus lens group 3 to the start position set in step S51. The CPU 15 executes a scan AF process of detecting an in-focus position while moving the focus lens group 3 by a predetermined moving amount from the start position serving as the origin.

In step S53, the CPU 15 determines whether the focus lens group 3 has reached the end position set in step S51. If the focus lens group 3 has not reached the end position, the CPU 15 controls the image sensing device or the like, and acquires image data corresponding to the position of the focus lens group 3 sat that point. The image data is input to the scan AF processing circuit 14 via the image sensing circuit 6 and A/D conversion circuit 7, and an AF evaluation value is calculated in step S54. The AF evaluation value is input to the CPU 15, and stored in the internal arithmetic memory of the CPU 15. In step S55, the CPU 15 moves the focus lens group 3 by a predetermined moving amount. The flow then returns to step S53 to repeat the same processes until the focus lens group 3 reaches the set end position.

If the focus lens group 3 is determined in step S53 to have reached the end position, the flow advances to step S56. In step S56, the CPU 15 calculates an in-focus position on the basis of the AF evaluation value calculated in step S55. In step S57, the CPU 15 drives the focus motor 22 via the second motor driving circuit 19 on the basis of the calculation result, moves the focus lens group 3 to the in-focus position, and stop it at the position, ending the sequence. After that, the flow advances to step S9 in FIG. 2.

The series of operations will be explained with reference to FIG. 6.

For example, when the focus lens group 3 stays at a position A in FIG. 6, it moves from the position A to a position B obtained by subtracting Gs from a passive AF distance measurement result serving as a start position (step S52). A scan AF process is executed until the focus lens group 3 reaches from the start position serving as the origin a position C obtained by adding Gs to a passive AF distance measurement result serving as an end position (steps S52 to S55). The CPU 15 calculates an in-focus position on the basis of an acquired AF evaluation value (step S56). By this calculation, the position of the focus lens group 3 that corresponds to a position D in FIG. 6, i.e., the peak value of a high-frequency component is obtained as an in-focus position. After that, the CPU 15 drives the focus lens group 3 to the obtained position (step S57).

As described above, according to the first embodiment, a passive AF result is corrected using the in-focus position by scan AF and information on the result of immediately preceding passive AF in an autofocusing apparatus comprising an image sensing device which photoelectrically converts an object image formed by a photographing optical system to obtain an electrical image signal, an in-focus position detection device which has a focusing device for adjusting the focus of the object image formed on the image sensing device and detects an in-focus position from the image signal generated by the image sensing device while driving the focusing device, and an external distance measurement device which is formed from a plurality of light-receiving devices that are arranged separately from the image sensing device and receive a beam from the object, and obtains a distance to the object on the basis of outputs from the light-receiving devices. Errors caused by an environmental change in temperature or the like, the adjustment/assembly errors of the external distance measurement device and in-focus position detection device, and the like are absorbed. The distance range (effective range) within which the distance measurement ranges of the passive AF device and scan AF device are regarded to coincide with each other is widened. In addition, the influence of an environmental change in temperature or the like can be eliminated to increase the distance measurement precision of the passive AF device. The detection range for fine adjustment of detecting an accurate in-focus position in the scan AF process can be narrowed to increase the processing speed.

Second Embodiment

The basic configuration and basic operation sequence of the second embodiment are the same as those of the first embodiment. FIG. 1 is a block diagram showing an image sensing apparatus according to the second embodiment, and FIG. 2 shows the operation sequence.

The second embodiment is different from the first embodiment in that the distance measurement result of a passive AF device is corrected using a temperature measured by a thermometer also when the distance measurement result is to be corrected using the result of immediately preceding scan AF. The second embodiment can achieve more accurate correction.

A process of correcting a distance measurement result by using the result of immediately preceding scan AF will be explained.

This process is performed when variations in temperature do not occur (can be ignored) in immediately preceding scan AF and current passive AF. The result of passive AF is corrected using information on the in-focus position by scan AF. Correction is done utilizing the difference between the result of immediately preceding passive AF and that of current passive AF.

Letting xcal be the result (prediction value) of passive AF which does not perform any correction by using the reading of the thermometer, xpre be the result (prediction value) of immediately preceding passive AF, and LpreTv be a value obtained by converting the result (in-focus position) of immediately preceding scan AF into a distance, a distance measurement result L corrected using the result of immediately preceding scan AF is given by $$L = Bf/\{xcal + (Tg - Tadj) * \Delta xT/2 + Bf/LpreTv - xpre\}$$

where Tg is the reading of the thermometer upon executing passive AF, Tadj is the reading of the thermometer upon measuring Bf in a step or the like, $\Delta xT$ is the temperature correction coefficient of the prediction value, and Bf is the Bf product described above.

This correction can absorb errors caused by an environmental change in temperature or the like, the adjustment/assembly errors of the external distance measurement device and in-focus position detection device, and the like. The near point Lnear and far point Lfar of the distance range within which the distance measurement ranges of the passive AF device and scan AF device are regarded to coincide with each other are given by $$Lnear, Lfar = Lo/\{1 \pm W_{SAF}/(dy \cdot fT)\} \qquad (11)$$

In this way, the effective range of the passive AF result also becomes wider.

By this correction, the influence of an environmental change in temperature or the like can be removed to increase the distance measurement precision of the passive AF device. The detection range for fine adjustment of detecting an accurate in-focus position in the scan AF process can be narrowed to increase the processing speed.

As described above, according to the second embodiment, a passive AF result is corrected using the in-focus position by scan AF and information on the result of immediately preceding passive AF in an autofocusing apparatus comprising an image sensing device which photoelectrically converts an object image formed by a photographing optical system to obtain an electrical image signal, an in-focus position detection device which has a focusing device for adjusting the focus of the object image formed on the image sensing device and detects an in-focus position from the image signal generated by the image sensing device while driving the focusing device, and an external distance measurement device which is formed from a plurality of light-receiving devices that are arranged separately from the image sensing device and receive a beam from the object, and obtains a distance to the object on the basis of outputs from the light-receiving devices. Errors caused by an environmental change in temperature or the like, the adjustment/assembly errors of the external distance measurement device and in-focus position detection device, and the like are absorbed. The distance range (effective range) within which the distance measurement ranges of the passive AF device and scan AF device are regarded to coincide with each other is widened. In addition, the influence of an environmental change in temperature or the like can be eliminated to increase the distance measurement precision of the passive AF device. The detection range for fine adjustment of detecting an accurate in-focus position in the scan AF process can be narrowed to increase the processing speed.

Third Embodiment

The third embodiment inhibits correction when no correction precision can be ensured in correcting the result of passive AF by the result of immediately preceding scan AF.

The basic block configuration of an image sensing apparatus according to the third embodiment is the same as that according to the first embodiment shown in FIG. 1.

The operation of the image sensing apparatus according to the third embodiment will be explained with reference to the flowchart shown in FIG. 7.

A photographing process sequence is executed when the main power switch of an image sensing apparatus 1 is ON and the operation mode of the image sensing apparatus is the photographing (recording) mode.

A CPU 15 displays as an image on an LCD 10 an image which has passed through a photographing lens barrel 31 and is formed on a CCD 5.

In step S101, zooming operation is done. Whether the zoom switch of an operation switch 24 has been operated is determined. If the zoom switch has been operated to the Tele side, the zoom position is moved to the Tele side until the zoom position reaches the Tele end or the operation to the zoom switch ends. If the zoom switch has been operated to the Wide side, the zoom position is moved to the Wide side until the zoom position reaches the Wide end or the operation to the zoom switch ends. If the zoom position reaches the zoom end or the operation to the zoom switch ends, the current zoom position is stored in the internal arithmetic memory of the CPU 15.

In step S102, the state of a shutter button is confirmed. If the CPU 15 recognizes an instruction signal for starting an AE process and AF process prior to photographing operation upon operation to the shutter button by the photographer, the flow advances to step S103 to execute a general AE process.

In step S104, a passive AF process is done. The CPU 15 controls a passive AF device 30, and reads out images formed on the sensors of the passive AF device 30 on the basis of two beams. The two readout image signals are A/D-converted, and then input to the CPU 15. The CPU 15 calculates the image shift amount from the two image signals, and a distance to the object.

After the distance measurement result by the passive AF device is attained in step S104, the CPU 15 obtains a set value representing the position of a focus lens group 3 that corresponds to the distance attained by the passive AF device, and defines the set value as a passive AF in-focus position G1.

In step S105, an exposure instruction (second stroke of the shutter button) is confirmed.

If exposure is designated, the flow advances to step S106 to drive the focus lens group 3 to the in-focus position G1 obtained in the passive AF process of step S104. In step S107, the CPU 15 controls a first motor driving circuit 18 to drive and control a stop 4 to a larger F-number via a stop driving motor 21. As a result, the depth of field becomes larger, and the error of the in-focus position by passive AF is absorbed. The accumulation time of the CCD 5 that is set in step S103 is prolonged by the stop-down amount of the stop 4, so the exposure amount does not run short after stopping down the stop 4. If prolongation of the accumulation time may cause camera shake or the like and adversely affect the image quality, the sensitivity of the CCD 5 is increased without prolonging the accumulation time. An increase in sensitivity leads to an increase in noise, and thus the sensitivity is increased after the accumulation time is prolonged up to a value at which no camera shake occurs.

Thereafter, the flow advances to step S112 to execute an actual exposure process in accordance with the settings in step S107.

If no exposure is designated, the flow advances to step S108 to execute scan AF. When scan AF is performed, the passive AF process functions as an AF process for coarse adjustment of detecting an approximate distance (in-focus position of the focus lens group 3) to a desired object. The scan AF process functions as a process for fine adjustment of detecting an accurate in-focus position.

More specifically, the CPU 15 moves the focus lens group 3 close to the in-focus position obtained by the passive AF process in step S104. In step S108, the CPU 15 performs a scan AF process for fine adjustment of detecting an accurate in-focus position. In this case, while the focus lens group 3 is finely driven, an output from the scan AF processing circuit is monitored to obtain the position of the focus lens group 3 at which a high-frequency component output from an image signal generated by the CCD 5 maximizes.

In step S109, the focus lens group 3 is driven to the in-focus position.

After the predetermined AF process ends, the AE process is executed again in step S110. In step S111, the CPU 15 confirms an exposure instruction (second stroke of the shutter button). If exposure is designated, the flow advances to step S112 to execute an actual exposure process.

If exposure is designated during the scan AF process., the flow advances to step S112 after the end of the scan AF process (steps S108 and S109) to execute an actual exposure process.

If no exposure is designated in step S111, the flow advances to step S113 to determine whether the zoom switch of the operation switch 24 has been operated. Zooming operation is done similarly to step S101.

In step S114, the passive AF process is performed again. In the passive AF process, the distance measurement result is corrected using the result of immediately preceding scan AF.

Details of correction will be described.

A concrete correction method will be explained.

Conditions for correcting the result of passive AF by the result of immediately preceding scan AF are shown in the left graph of FIG. 4 and FIG. 8.

Whether the lens is focused as a result of immediately preceding scan AF is determined. If the lens is not focused, correction using the result of immediately preceding scan AF is not performed, but correction (to be described later) of the distance measurement result of the passive AF device using a temperature measured by a thermometer arranged near the passive AF device is done.

A zoom position (ZPpre_scan) in immediately preceding scan AF and a zoom position (ZPnow_passive) in the passive AF process are checked.

When the zoom position in the passive AF process is closer to the Tele side by a predetermined value or more than the zoom position in immediately preceding scan AF, correction using the result of immediately preceding scan AF is not performed, but correction (to be described later) of the distance measurement result of the passive AF device using a temperature measured by the thermometer arranged near the passive AF device is executed.

Also when the zoom position in immediately preceding scan AF is closer to the Wide side by a predetermined value (ZPconst2) or more, correction using the result of immediately preceding scan AF is not performed, but correction (to be described later) of the distance measurement result of the passive AF device using a temperature measured by the thermometer arranged near the passive AF device is executed.

The reason why correction using the result of immediately preceding scan AF is not performed in accordance with the zoom position is that the result of scan AF at a wide-angle zoom position exhibits a poor precision to the object distance owing to a large depth of field, the correction precision decreases when this result is used for correction of the passive AF device, and thus a desired purpose cannot be achieved.

When the macro/non-macro setting changes between immediately preceding scan AF and passive AF, correction using the result of immediately preceding scan AF is not performed, but correction (to be described later) of the distance measurement result of the passive AF device using a temperature measured by the thermometer arranged near the passive AF device is performed.

This prevents a decrease in the correction precision of the passive AF device when the object distance greatly changes owing to different macro/non-macro settings.

Time Timepre at which immediately preceding AF (both passive AF and scan AF) is done and current time Timenow are compared, and if the difference is equal to or smaller than a predetermined value Timeconst1, the flow advances to a process of correcting a distance measurement result by using the result of immediately preceding scan AF. In this case, even if the reading of the thermometer greatly changes, the reading changes only within a short time, and expansion/contraction of a member can be ignored.

If the time difference is larger than a predetermined value Timeconst2, correction of the distance measurement result of the passive AF device using a temperature measured by the thermometer is executed. In this case, even if a change in the reading of the thermometer is small, the situation may change, and expansion/contraction of a member may not be ignored.

If the time difference Timenow−Timepre satisfies Timeconst1<Timenow−Timepre≧Timeconst2, a temperature Tpre of preceding AF and a current temperature Tnow are compared. If the difference Tnow−Tpre is equal to or smaller than Tconst1, the flow advances to a process of correcting a distance measurement result by using the result of immediately preceding scan AF. This is because expansion/contraction of a member can be ignored when a change in the reading of the thermometer is small. When Tnow−Tpre is larger than Tconst1, correction of the distance measurement result of the passive AF device using a temperature measured by the thermometer is done. This is because expansion/contraction of a member cannot be ignored when a change in the reading of the thermometer is large.

The process of correcting the distance measurement result of the passive AF device by using the result of immediately preceding scan AF, and the process of correcting the distance measurement result of the passive AF device by using a temperature measured by the thermometer are executed similarly to the first embodiment. Scan AF operation in step S108 of FIG. 7 is also executed similarly to scan AF operation (described in detail with reference to FIGS. 5 and 6) in step S7 of FIG. 2 according to the first embodiment.

As described above, the third embodiment can prevent a decrease in the correction precision of a distance measurement result at a poor precision to the object distance of the in-focus position detection device owing to a large depth of field at a wide-angle zoom position when the distance measurement result of the distance measurement device is corrected using the in-focus position of the in-focus position detection device and the distance measurement result of the distance measurement device. The third embodiment can also prevent a decrease in the correction precision of the distance measurement result when the object distance greatly changes owing to different macro/non-macro settings.

Consequently, the precision and speed of autofocusing operation can be increased.

Other Embodiment

The object of the embodiments is also achieved when a storage medium (or recording medium) which stores software program codes for realizing the functions of the above-described embodiments is supplied to a system or apparatus, and the computer (or the CPU or MPU) of the system or apparatus reads out and executes the program codes stored in the storage medium. In this case, the program codes read out from the storage medium realize the functions of the above-described embodiments, and the storage medium which stores the program codes constitutes the present invention. The functions of the above-described embodiments are realized when the computer executes the readout program codes. Also, the functions of the above-described embodiments are realized when an OS (Operating System) or the like running on the computer performs some or all of actual processes on the basis of the instructions of the program codes.

Furthermore, the functions of the above-described embodiments are realized when the program codes read out from the storage medium are written in the memory of a function expansion card inserted into the computer or the memory of a function expansion unit connected to the computer, and the CPU of the function expansion card or function expansion unit performs some or all of actual processes on the basis of the instructions of the program codes.

When the present invention is applied to the storage medium, the storage medium stores program codes corresponding to the above-described flow charts.

The present invention is not limited to the above embodiments and various changes and modifications can be made within the spirit and scope of the present invention. Therefore, to apprise the public of the scope of the present invention the following claims are made.

CLAIM OF PRIORITY

This application claims priority from Japanese Patent Application No. 2003-377264 which was filed on Nov. 6, 2003 and No. 2004-163743 which was filed on Jun. 1, 2004, which are hereby incorporated by reference herein.

What is claimed is:

1. An image sensing apparatus comprising:
a photographing optical system which forms an object image, said photographing optical system having a focusing optical system which adjusts an imaging position of the object image;
an image sensing element which photoelectrically converts the object image formed by said photographing optical system to generate an electrical image signal;
an in focus position detection device which detects an in focus position of said focusing optical system for forming the object image on said image sensing element, on the basis of the image signal generated by said image sensing element while said focusing optical system adjusts the imaging position of the object image; and
a distance measurement device which has a light receiving device for receiving a beam from an object, and measures a distance to the object on the basis of an output signal from said light receiving device,
wherein a detection range for detecting a further in focus position in said in focus position detection device is controlled in accordance with a measurement result of said distance measurement device, and wherein said arithmetic device corrects the distance measurement result of said distance measurement device on the basis of the detection results of said in focus position detection device and said distance measurement device when a difference between time at which distance measurement operation is performed by said distance measurement device and time at which immediately preceding in focus position detection is performed by said in focus position detection device is not more than a predetermined time, and a difference between a temperature obtained when the distance measurement operation is performed by said distance measurement device and a temperature obtained when the immediately preceding in focus position detection is performed by said in focus position detection device is not more than a predetermined temperature.

2. An image sensing apparatus comprising:

a photographing optical system which forms an object image, said photographing optical system having a focusing optical system which adjusts an imaging position of the object image and a zoom optical system for changing a view angle of a photographing frame;

an image sensing element which photoelectrically converts the object image formed by said photographing optical system to generate an electrical image signal;

an in-focus position detection device which detects an in-focus position of said focusing optical system for forming the object image on said image sensing element, on the basis of the image signal generated by said image sensing element while said focusing optical system adjusts the imaging position of the object image;

a distance measurement device which has a light-receiving device for receiving a beam from an object, and measures a distance to the object on the basis of an output signal from said light-receiving device; and an arithmetic device which corrects a distance measurement result of said distance measurement device on the basis of detection results of said in-focus position detection device and said distance measurement device, wherein when a zoom position of said zoom optical system in distance measurement operation by said distance measurement device is closer to a telephoto side by not less than a predetermined value than a zoom position in immediately preceding in-focus position detection by said in-focus position detection device, correction of the distance measurement result of said distance measurement device is inhibited.

3. An image sensing apparatus comprising:

a photographing optical system which forms an object image, said photographing optical system having a focusing optical system which adjusts an imaging position of the object image and a zoom optical system for changing a view angle of a photographing frame;

an image sensing element which photoelectrically converts the object image formed by said photographing optical system to generate an electrical image signal;

an in-focus position detection device which detects an in-focus position of said focusing optical system for forming the object image on said image sensing element, on the basis of the image signal generated by said image sensing element while said focusing optical system adjusts the imaging position of the object image;

a distance measurement device which has a light-receiving device for receiving a beam from an object, and measures a distance to the object on the basis of an output signal from said light-receiving device; and an arithmetic device which corrects a distance measurement result of said distance measurement device on the basis of detection results of said in-focus position detection device and said distance measurement device, wherein when a zoom position obtained when in-focus position detection by said in-focus position detection device is performed immediately preceding to distance measurement operation by said distance measurement device is closer to a wide-angle side by a predetermined value, correction of the distance measurement result of said distance measurement device is inhibited.

4. An image sensing apparatus comprising:

a photographing optical system which forms an object image, said photographing optical system having a focusing optical system which adjusts an imaging position of the object image, a zoom optical system for changing a view angle of a photographing frame, and a macro function capable of near-distance photographing;

an image sensing element which photoelectrically converts the object image formed by said photographing optical system to generate an electrical image signal;

an in-focus position detection device which detects an in-focus position of said focusing optical system for forming the object image on said image sensing element, on the basis of the image signal generated by said image sensing element while said focusing optical system adjusts the imaging position of the object image;

a distance measurement device which has a light-receiving device for receiving a beam from an object, and measures a distance to the object on the basis of an output signal from said light-receiving device; and an arithmetic device which corrects a distance measurement result of said distance measurement device on the basis of detection results of said in-focus position detection device and said distance measurement device, wherein when a macro/non-macro setting of the macro function changes between distance measurement operation by said distance measurement device and immediately preceding in-focus position detection by said in-focus position detection device, correction of the distance measurement result of said distance measurement device is inhibited.

5. A method of controlling an image sensing apparatus having a photographing optical system which forms an object image, the photographing optical system having a focusing optical system which adjusts an imaging position of the object image and a zoom optical system for changing a view angle of a photographing frame, an image sensing element which photoelectrically converts the object image formed by the photographing optical system to generate an electrical image signal, an in-focus position detection device which detects an in-focus position of the focusing optical system for forming the object image on the image sensing element, on the basis of the image signal generated by the image sensing element while the focusing optical system adjusts the imaging position of the object image, and a distance measurement device which has a light-receiving device for receiving a beam from an object, and measures a distance to the object on the basis of an output signal from the light-receiving device, comprising an arithmetic step of correcting a distance measurement result of the distance measurement device on the basis of detection results of the in-focus position detection device and the distance measurement device, wherein when a zoom position of the zoom optical system in distance measurement operation by the distance measurement device is closer to a telephoto side by not less than a predetermined value than a zoom position in immediately preceding in-focus position detection by the in-focus position detection device, correction of the distance measurement result of the distance measurement device is inhibited.

6. A method of controlling an image sensing apparatus having a photographing optical system which forms an object image, the photographing optical system having a focusing optical system which adjusts an imaging position of the object image and a zoom optical system for changing a view angle of a photographing frame, an image sensing element which photoelectrically converts the object image formed by the photographing optical system to generate an electrical image signal, an in-focus position detection device which detects an in-focus position of the focusing optical system for forming the object image on the image sensing element, on the basis of the image signal generated by the image sensing element while the focusing optical system adjusts the imaging position of the object image, and a distance measurement device which has a light-receiving device for receiving a beam from an object, and measures a distance to the object on the basis of an output signal from the light-receiving device, comprising an arithmetic step of correcting a distance measurement result of the distance measurement device on the basis of detection results of the in-focus position detection device and the distance measurement device, wherein when a zoom position obtained when in-focus position detection by said in-focus position detection device is performed immediately preceding to distance measurement operation by said distance measurement device is closer to a wide-angle side by a predetermined value, correction of the distance measurement result of said distance measurement device is inhibited.

7. A method of controlling an image sensing apparatus having a photographing optical system which forms an object image, the photographing optical system having a focusing optical system which adjusts an imaging position of the object image, a zoom optical system for changing a view angle of a photographing frame, and a macro function capable of near-distance photographing, an image sensing element which photoelectrically converts the object image formed by the photographing optical system to generate an electrical image signal, an in-focus position detection device which detects an in-focus position of the focusing optical system for forming the object image on the image sensing element, on the basis of the image signal generated by the image sensing element while the focusing optical system adjusts the imaging position of the object image, and a distance measurement device which has a light-receiving device for receiving a beam from an object, and measures a distance to the object on the basis of an output signal from the light-receiving device, comprising an arithmetic step of correcting a distance measurement result of the distance measurement device on the basis of detection results of the in-focus position detection device and the distance measurement device, wherein when a macro/non-macro setting of the macro function changes between distance measurement operation by said distance measurement device and immediately preceding in-focus position detection by said in-focus position detection device, correction of the distance measurement result of said distance measurement device is inhibited.

8. An image sensing apparatus comprising:

a photographing optical system which forms an object image, said photographing optical system having a focusing optical system which adjusts an imaging position of the object image;

an image sensing element which photoelectrically converts the object image formed by said photographing optical system to generate an electrical image signal;

an in focus position detection device which detects an in focus position of said focusing optical system for forming the object image on said image sensing element, on the basis of the image signal generated by said image sensing element while said focusing optical system adjusts the imaging position of the object image;

a distance measurement device which has a light receiving device for receiving a beam from an object, and measures a distance to the object on the basis of an output signal from said light receiving device; and an arithmetic device which corrects a distance measurement result of said distance measurement device on the basis of detection results of said in focus position detection device and said distance measurement device, wherein an object distance range within which detection ranges of said in focus position detection device and said distance measurement device are regarded to coincide with each other is controlled in accordance with a correction result of said arithmetic device, and wherein said arithmetic device corrects the distance measurement result of said distance measurement device on the basis of the detection results of said in focus position detection device and said distance measurement device when a difference between time at which distance measurement operation is performed by said distance measurement device and time at which immediately preceding in focus position detection is performed by said in focus position detection device is not more than a predetermined time, and a difference between a temperature obtained when the distance measurement operation is performed by said distance measurement device and a temperature obtained when the immediately preceding in focus position detection is performed by said in focus position detection device is not more than a predetermined temperature.

* * * * *

UNITED STATES PATENT AND TRADEMARK OFFICE
CERTIFICATE OF CORRECTION

PATENT NO.         : 7,411,624 B2
APPLICATION NO.    : 10/971093
DATED              : August 12, 2008
INVENTOR(S)        : Kazuki Konishi et al.

It is certified that error appears in the above-identified patent and that said Letters Patent is hereby corrected as shown below:

COLUMN 12
    Line 8, "field-becomes" should read --field becomes--.

COLUMN 15
    Line 48, "other-are" should read --other are--.

COLUMN 18
    Line 25, "ranges-of" should read --ranges of--.

COLUMN 21
    Line 35, "$\geq$" should read --$\leq$--.

Signed and Sealed this

Tenth Day of February, 2009

JOHN DOLL
*Acting Director of the United States Patent and Trademark Office*